United States Patent [19]

Tsurumi et al.

[11] Patent Number: 4,515,914
[45] Date of Patent: May 7, 1985

[54] CROSSLINKED LATEXES ENCAPSULATED WITH LINEAR POLYMERS

[75] Inventors: Michio Tsurumi, Yokohama, Japan; Do I. Lee, Midland, Mich.

[73] Assignee: The Dow Chemical Company, Midland, Mich.

[21] Appl. No.: 543,198

[22] Filed: Oct. 19, 1983

[51] Int. Cl.³ .............................................. C08L 9/00
[52] U.S. Cl. ..................................... 523/201; 524/575
[58] Field of Search .......................... 523/201; 524/575

[56] References Cited

U.S. PATENT DOCUMENTS

| | | | |
|---|---|---|---|
| 3,256,233 | 6/1966 | Hahn et al. | 523/201 |
| 3,296,176 | 1/1967 | Fantl | 523/201 |
| 3,804,881 | 4/1974 | Bassett et al. | 260/470 A |
| 3,970,725 | 7/1976 | Tugukuni | 524/37 |
| 4,150,005 | 4/1979 | Gehman et al. | 524/460 |
| 4,156,669 | 5/1979 | Lee | 260/29.7 R |
| 4,187,202 | 2/1980 | Kondo et al. | 260/4 R |

FOREIGN PATENT DOCUMENTS

| | | | |
|---|---|---|---|
| 54-131013 | 10/1979 | Japan | 523/201 |
| 54-151606 | 11/1979 | Japan | 523/201 |

Primary Examiner—Joseph L. Schofer
Assistant Examiner—N. Sarofim

[57] ABSTRACT

Highly coalescence-capable and deformable latexes have a controlled crosslinking density. For example, a styrene/butadiene core is prepared using conventional emulsion polymerization techniques and at a point at which much of the butadiene is converted to polymer a second stage monomer mixture comprising monovinyl monomers is contacted with the initial mixture to yield a latex having a shell region comprising essentially linear polymers which are partially covalently bonded to said core region.

9 Claims, No Drawings

CROSSLINKED LATEXES ENCAPSULATED WITH LINEAR POLYMERS

BACKGROUND OF THE INVENTION

This invention relates to stable, aqueous latexes and to methods for their preparation.

Aqueous dispersions of polymers, which are referred to in the art as latexes, are generally known to be useful, both alone and in various formulations, as coatings and impregnants. A wide variety of latexes of differing homopolymeric and copolymeric compositions (such as styrene-butadiene copolymers, acrylic homopolymers and copolymers, vinylidene chloride homopolymers and copolymers, etc.) have been developed having specific chemical and/or mechanical properties for particular end use applications. For example, aqueous interpolymer latexes resulting from the emulsion polymerization of monovinyl aromatic monomers, such as styrene; diolefins, such as butadiene; and monoethylenically unsaturated carboxylic acids, such as acrylic acid; are known to be particularly useful as film-forming binders for pigments in paper coating applications. See, for example, U.S. Pat. Nos. 3,399,080 and 3,404,116. Such emulsion polymerizations optionally employ conventional seeding procedures for optimum control of polymerization and in order to obtain maximum product uniformity (e.g., narrow particle size distribution).

It is desirable to produce diene-containing latexes which exhibit good particle coalescence during film formation. However, the extent of crosslinking reactions of diene-containing copolymers depends upon the monomer to polymer ratio in the reaction locus under isothermal reaction conditions. That is, the rate of crosslinking reactions becomes greater at the lower monomer to polymer ratio (i.e., at high conversions) resulting in highly crosslinked latexes. Consequently, highly converted diene-containing latex particles can exhibit poor particle coalescence during film formation due to highly crosslinked surfaces. This results in deficient water and solvent resistance and inferior mechanical properties of both dry and wet latex films.

Chain transfer agents provide a useful way for controlling the molecular weight and reducing the effect of severe crosslinking upon latex particle coalescence. However, the deformability or elongation and, thus, coalescence of latex films increases with increasing amounts of chain transfer agents only upon sacrificing the tensile strength of the latex film. Therefore, the optimum level of chain transfer agent has to be a compromise between these opposing effects.

In view of all of the previously stated obstacles, it is highly desirable to minimize the extent of crosslinking of diene-containing latexes at the latex surface domain, and to develop latexes that are highly water and solvent resistant and are highly coalescence-capable.

SUMMARY OF THE INVENTION

The present invention is a process for preparing coalescence-capable and deformable aqueous polymer latexes having controlled crosslinking density wherein the dispersed polymer particles are heterogeneous, which process comprises:

(a) preparing by emulsion polymerization a core domain comprising the polymerization product of a portion of a first stage monomer mixture comprising at least one monovinyl aromatic monomer and at least one open chain conjugated diene monomer and (b) contacting said first stage monomer mixture at a point at which said mixture is partially polymerized with a second stage monomer mixture comprising at least one monovinyl monomer wherein said second stage monomer mixture is introduced when the rate of conversion of monomer to polymer is such that (1) the latex particles so formed are not highly crosslinked, and (2) the second stage monomer mixture is polymerized to yield essentially linear polymers to encapsulate the core domain as a shell and is partially covalently bonded to the partially polymerized core domain.

In another aspect, the present invention is a coalescence-capable and deformable latex having controlled crosslinking density which is prepared using the process of this invention.

The latexes of this invention exhibit excellent mechanical properties as a result of their complete coalescence among particles upon drying. Thus, the latexes of this invention exhibit superior coating properties for those applications as are known in the art. Such applications include uses in paper coatings, textiles, composite paper, carpet backing, adhesives, and the like.

DETAILED DESCRIPTION OF THE INVENTION

The polymer particles of this invention are broadly characterized as latex particles comprising a crosslinked core domain which is generally encapsulated with a shell comprising linear polymers such that the surface domain of the resulting latexes is coalescence-capable. By "coalescence-capable" is meant a high inter-diffusion capability of the latex surface copolymers with other latex particles. By "encapsulation" is meant the enclosure of the latex core domain with a shell domain showing high autohesion characteristics. For purposes of this invention, the shell domain which encapsulates the core comprises a polymer prepared from monovinyl monomers which are partially covalently bonded with the core polymer and are partially polymerized within the core domain.

For purposes of this invention, the term "conversion" is meant the reaction of a species from monomer to polymer. By "high conversion" is meant a high concentration of species in polymer form relative to those species in monomer form.

By "domain" is meant a discrete region within the aforementioned latex particle which is either a region capable of crosslinking comprising polymerized open chain aliphatic conjugated dienes, or a region which is coalescence-capable and composed essentially of monovinyl monomers.

The distribution within the latex particle of the crosslinked core domain and the coalescence-capable, essentially linear polymer shell domain can vary. For example, the latex particle can have essentially only two fairly distinct regions, e.g., a crosslinked core circumscribed by a shell or essentially mutually exclusive hemispherical regions. On the other hand, the latex particle can have multiple regions of one or both components. For example, a generally spherical continuous region of one polymer can have several discrete regions of the other polymers dispersed in, or residing on the surface of, the continuous region. Alternatively, the latex particle can have an essentially continuous web-like region of one polymer that has its interstices filled with the other polymer. It is understood that it is necessary that the core domain be at least partially covalently bonded to the shell domain, and that the surface of the latex not be highly crosslinked as this detrimentally effects coalescence capability.

The term "open chain conjugated diene" is meant to include, for example, 1,3-butadiene, 2-methyl-1,3-butadiene, 2,3-dimethyl-1,3-butadiene, pentadiene, 2-neopentyl-1,3-butadiene and other hydrogen analogs of 1,3-butadiene and, in addition, the substituted 1,3-butadienes, such as 2-chloro-1,3-butadiene, 2-cyano-1,3-butadiene, the substituted straight chain conjugated pentadienes, the straight chain and branched chain conjugated hexadienes, other straight and branched chain conjugated dienes typically having from 4 to about 9 carbon atoms, and comonomeric mixtures thereof. The 1,3-butadiene hydrocarbon monomers such as those mentioned hereinbefore provide interpolymers having particularly desirable properties and are therefore preferred, with 1,3-butadiene the most preferred open chain aliphatic conjugated diene. Such open chain aliphatic conjugated dienes constitute from about 30 to about 70, preferably about 50, weight percent of the aforementioned initial monomer charge. Accordingly, such open chain conjugated dienes constitute corresponding weight percentages of the core domain of the latex particles.

The term "monovinyl aromatic monomer" is intended to include those monomers wherein a radical of the formula

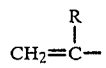

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho-, meta- and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, vinylnaphthalene, diverse vinyl(alkylnaphthalenes) and vinyl(halonaphthalenes) and comonomeric mixtures thereof. Styrene and vinyltoluene are preferred, and styrene is especially preferred as the monovinyl aromatic monomer. Such monovinyl aromatic monomer constitutes from about 30 to about 70, preferably about 50, weight percent of the aforementioned initial monomer charge. Accordingly, such monovinyl aromatic monomer constitutes from about 30 to about 100, preferably about 50, weight percent of the second monomer charge.

The "monoethylenically unsaturated carboxylic acids" employed in the practice of this invention can vary. Such acids must be copolymerizable with the other monomers of the monomer charge employed. Examples of such acids include itaconic acid, maleic acid, acrylic acid, methacrylic acid, fumaric acid, vinyl benzoic acid and isopropenyl benzoic acid. Comonomeric mixtures of such monoethylenically unsaturated acids can be employed if desired. Such acids can be introduced to the polymerization charge as such or they can be formed in situ in an aqueous polymerization medium by introducing a hydrolyzable derivative of such acid (e.g., salts or the anhydride of the desired acid) into such aqueous medium. The aforementioned monoethylenically unsaturated carboxylic acids constitute from about 0 to about 10, preferably from about 2 to about 5, weight percent of the initial monomer charge employed in this invention. Alternatively, the aforementioned acids can also be employed in the second monomer charge.

In addition to the aforementioned monovinyl aromatic monomers, there can optionally, though preferably, be employed in the second monomer charge about 0 to about 70 weight percent (based on the weight of the second monomer charge) of at least one other monovinyl monomer. Suitable monomers include, for example, hydroxyalkyl acrylates wherein the alkyl group typically contains from 2 to about 4 carbon atoms such as 2-hydroxyethyl acrylate or 3-hydroxypropyl acrylate; alkyl acrylates wherein the alkyl group contains from 1 to about 18 carbon atoms, such as methyl acrylate, ethyl acrylate, butyl acrylate, 2-ethylhexyl acrylate, etc.; alkyl methacrylates such as methyl methacrylate, ethyl methacrylate, n-butyl methacrylate and similar alkyl methacrylates wherein the alkyl group contains from 1 to about 18 carbon atoms; acrylonitrile, methacrylonitrile and similar nitriles; vinyl acetates; vinyl chloride and vinylidene chloride and the previously mentioned monoethylenically unsaturated carboxylic acids.

It is preferable to employ a conventional chain transfer agent such as bromoform, carbon tetrachloride, long chain mercaptans (e.g., lauryl mercaptan, dodecyl mercaptan, etc.) or other known chain transfer agents in the preparation of the core domain. Conventional amounts (e.g., from about 0.1 to about 10 weight percent based on the total monomer charge) of such chain transfer agents are typically employed in such preferred embodiments.

The latexes of the present invention are advantageously prepared by emulsion polymerizing about 60 to about 90, preferably about 80, parts by weight (based upon 100 parts by weight of total latex product) of an initial monomer charge comprising a monovinylidene aromatic monomer, an open chain conjugated diene and, optionally, a monoethylenically unsaturated carboxylic acid. The mixture is allowed to react thus forming the core domain until the point at which about 60 to about 90 weight percent, preferably from about 70 to about 75 weight percent of the diene monomer present is converted to polymer. This point of conversion can vary depending upon reaction conditions and the monomer mixture comprising the monomer charge. At this point about 10 to 40, preferably about 20, parts by weight (based upon 100 parts by weight of the total latex product) of a second charge comprising a monovinyl monomer or monomer mix are added to the initial mixture.

The polymerization of the core polymer domain to form the dispersed particles can be accomplished by known procedures for polymerization in aqueous emulsion. Optionally, conventional seeding procedures can be employed to aid in the control of the polymerization and in achieving the desired average particle size and particle size distribution for the core polymer particles. Typically, such seed is employed in amounts corresponding to from about 0.1 to about 1 percent of the final latex particle weight. Generally, such seed ranges in size from about 10 to about 20 percent of the diameter of the core particles formed. As with the core particles themselves, the seed latex can constitute a previously prepared latex or it can be prepared in situ. In this latter instance, the overall polymerization to form the latex of the invention can be viewed as essentially a three-stage polymerization in which (a) the first stage comprises preparation of the initial seed, (b) the second stage comprises preparation of the dispersed core polymer particles and (c) the third stage comprises polymerization of the aforementioned second monomer charge in the presence of such core polymer particles to form the objective coalescence-capable latex particles. The nature (i.e., monomer composition) of the seed latex can vary so long as it does not coagulate during formation of the core polymer particles.

In the preparation of the core domain, the monomers (and the aforementioned optional seed) to be employed for the core polymer are typically dispersed, with agitation sufficient to emulsify the mixture, in an aqueous medium which may contain a known free radical polymerization catalyst and/or a known emulsifying agent (i.e., surfactant) as well as other ingredients conventionally employed in the art as emulsion polymerization aids.

Suitable emulsifying agents which can be employed in the core domain polymerization include anionic, cationic and nonionic emulsifiers customarily used in emulsion polymerization. Usually at least one anionic emulsifier is included and one or more nonionic emulsifier can also be present. Representative types of anionic emulsifiers are the alkyl aryl sulfonates, alkali metal alkyl sulfates, the sulfonated alkyl esters, the fatty acid soaps and the like. Specific examples of these well-known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. Such emulsifying agents can be employed in varying amounts so long as adequate stability is achieved to produce core particles of the desired particle size and particle size distribution. For example, when a seed latex is employed in the aqueous medium to be used in the core polymer polymerization, suitable control of particle size and distribution generally can be conveniently achieved without addition of an emulsifying agent to the aqueous medium. However, as a general rule, an amount ranging from about 0.01 to about 5 weight percent, based upon the total monomer to be polymerized, is advantageously employed.

Suitable free radical polymerization catalysts for the aforementioned core polymer formation include those already known to promote emulsion polymerization. Among such catalysts are water-soluble oxidizing agents such as organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and catalysts which, like redox catalysts, are activated in the water phase, for example, by a water-soluble reducing agent.

Such catalysts are employed in an amount sufficient to cause polymerization (i.e., in a catalytic amount). As a general rule, an amount ranging from about 0.01 to about 5 weight percent based upon the total monomer to be polymerized is sufficient. Alternatively, other free radical producing means, such as exposure to activating radiations, can be employed rather than heat and/or catalytic compounds to activate the polymerization.

Other ingredients known in the art to be useful for various specific purposes in emulsion polymerization can also be employed in preparation of the core domain. For example, when the polymerizable constituents for the core domain include a monoethylenically unsaturated carboxylic acid comonomer, polymerization under acidic conditions (e.g., the aqueous media having a pH value of from about 2 to about 7, preferably from about 2 to about 5 is preferred. In such instances, the aqueous medium can include acids and/or salts to provide the desired pH value and possibly a buffered system. On the other hand, when a monoethylenically unsaturated carboxylic acid monomer is not employed, the pH of the aqueous medium can conveniently range from about 2 to about 10.

The manner of combining the aforementioned ingredients can vary. For example, various known monomer feed methods (such as continuous monomer addition, incremental monomer addition or addition in a single charge of the entire amount of monomer for the core domain) can be employed. Similarly, the entire amount of the aqueous medium (or specific ingredients thereof) can be present in the polymerization vessel before introduction of the initial monomer charge. Alternatively, the aqueous medium (or a portion thereof) can be added (continuously or incrementally) during the course of the polymerization.

Polymerization to form the latex particles is generally initiated by heating the emulsified mixture (with continued agitation) to a temperature usually between about 50° and about 110° C., preferably between about 70° and about 100° C. Polymerization is continued by maintaining the mixture at the selected temperature until the desired conversion of monomer to polymer has been reached.

The interpolymerization of the monovinyl aromatic monomer, the open chain aliphatic conjugated diene and the monoethylenically unsaturated carboxylic acid in the presence of the aforementioned second monomer or monomer mix can be accomplished pursuant to the emulsion polymerization procedures conventionally employed in the preparation of homogeneous interpolymers from such monomers. However, it is preferable that no (or only a small amount of) additional emulsifier (i.e., over and above that retained in the core polymer latex from its preparation) be employed. This feature is desirable in order that the majority of the interpolymerization occurs on, in, or around the existing dispersed core particles rather than initiating substantial amounts of homogeneous polymer particles from the addition of the second monomer or monomer mix.

Although the preferred addition of the second monovinyl monomer or monomer mix can be commenced so as to control the crosslinking density of the growing core particles at the range of conversions from about 60 to about 90 weight percent of the open chain aliphatic conjugated diene, it is understood, of course, that the rate of conversion at the point of monovinyl monomer addition depends on several factors. For example, the rate of conversion depends upon the nature of both the monomers reacted in the initial monomer charge and those reacted in the second charge. Conditions such as temperature, particle size and surfactant concentrations also will affect the rate of conversion. Correspondingly, if the second monomer charge is added prematurely, the crosslinking reaction will not be controlled because of the high concentration of unreacted conjugated diene remaining. Conversely, if the second monomer charge is added after most of the conjugated diene has reacted, crosslinking will not be controlled because of the low monomer-to-polymer ratio. That is, it is not desirable that there be a rigid boundary between the core and shell domains, but rather a region in which the shell polymer domain is partially covalently bonded to said core domain.

The two-step process of this invention produces latexes that have well-controlled crosslinking density which exhibit excellent mechanical properties as a result of a more complete coalescence among latex particles upon drying. That is, the latex exhibits higher deformability resulting from the lower crosslinked core and the better entanglement capabilities of the monovinyl copolymer shell. In addition, the addition of the monovinyl monomer or monomer mix at high conversion enables the skilled artisan to place various functional groups on the shell region of the latex more effectively than a conventional, single-stage process does. The linear polymer shell regions also provide better curing capabilities with external crosslinking agents. Further, encapsulated latex films exhibit significant improvement in the tensile strength of both dry and wet latex films, while retaining elongation as high as that observed in nonencapsulated latex particles.

The tensile strength of the latex particle can be increased by incorporating hard monomers in the second monomer charge. The hard resinous polymer particles which are dispersed in the aqueous medium in which the hereinbefore defined monomer charge is emulsion polymerized can be particles of any polymer having a glass transition temperature of at least about 85° C., preferably at least about 100° C. Such hard polymers include, for example, homopolymers and hard interpolymers of the hereinbefore defined monovinyl aromatic monomer (e.g., polystyrene, poly(vinyltoluene), poly(vinylnaphthalene), styrene-acrylonitrile copolymers, styrene-methacrylonitrile copolymers, styrene-methyl methacrylate copolymers, styrene-ethyl methacrylate copolymers, etc.); hard acrylic resins (e.g., poly(methyl methacrylate), poly(2-chloroethyl methacrylate), poly(isopropyl methacrylate), poly(phenyl methacrylate), polyacrylonitrile polymethacrylonitrile, etc.); and the like. Because of considerations such as polymer properties, availability and compatability with the polymer formed by polymerizing the aforementioned monomer charge, homopolymers and copolymers of styrene, acrylonitrile, methacrylonitrile and methyl methacrylate are preferred. By virtue of the low cost and availability of styrene, polystyrene and copolymers having styrene as the predominant monomer are especially preferred for use as the hard polymer particles. Optionally, a minor amount (e.g., from about 1 to about 10, preferably from about 2 to about 5, weight percent) of a monoethylenically unsaturated carboxylic acid such as those described hereinbefore can be employed in the hard polymer to affect reactor stability in the preparation of such hard polymer and colloidal stability of the resulting hard polymer latex.

Following polymerization, the solids content of the resulting aqueous polymer latex can be adjusted to the level desired by adding water thereto or by distilling water therefrom. Generally such desired level of polymeric solids content is from about 20 to about 65, preferably from about 45 to about 60, weight percent on a total weight basis.

The size of the aforementioned latexes can vary. However, for optimum coalescence and film-forming characteristics, it is generally desirable that such particles have an average diameter of from about 0.05 to about 0.4, preferably from about 0.1 to about 0.3, most preferably from about 0.15 to about 0.25, micrometers.

Suitable particle sizes can generally be achieved directly from the polymerization. However, screening of the resulting latex to remove particles outside the desired size range and to thus narrow the particle size distribution can be optionally employed.

For various applications, it is sometimes desirable to have small amounts of certain known additives incorporated in the latex. Typical examples of such additives are surfactants, bacteriocides (e.g., formaldehyde), neutralants, antifoamers, etc. Such additives can be incorporated into the latexes of the invention in a conventional manner and at any convenient point in the preparation of such latexes.

The following examples are intended to illustrate the invention and are not intended to limit the scope thereof. In the examples, all parts and percentages are by weight unless otherwise specified.

EXAMPLE 1

An initial aqueous medium is employed which contains 934.5 g of deionized water, 12 g of a 1 percent chelating agent such as the pentasodium salt of diethylenetriamine penta-acetic acid (sold commercially under the trade name VERSENEX ® 80 by The Dow Chemical Company), 24 g of itaconic acid and 14.8 g of a polystyrene seed latex. The seed latex is a 275 Å average diameter polystyrene seed latex (29.0 percent solid) in an amount corresponding to about 0.36 part (dry basis) per 100 parts of the total monomer to be polymerized in the two polymerization stages. This aqueous medium is charged into an automated, stainless steel reactor and heated to 90° C. under agitation.

An additional aqueous stream containing 4.80 g of deionized water, 13.3 g of a 45 percent surfactant such as sodium dodecyldiphenyl oxide sulfonate (sold commercially under the trade name DOWFAX ® 2A-1 by The Dow Chemical Company), 12 g of a 10 percent sodium hydroxide solution and 6 g of sodium persulfate.

A first stage monomer mix comprising 457.2 g of styrene, 480 g of butadiene and 28.8 g of the chain transfer agent carbon tetrachloride (3 weight percent based on the total weight of the initial monomer feed) is charged into the reactor at a feed rate of 402.5 g/hr for 2.4 hours. The second aqueous stream is simultaneously charged into the reactor at a feed rate of 127.8 g/hr for 4 hours.

At 1.9 hours after the first monomer mix has started, the second monomer mix comprising 120 g of butyl acrylate and 115.2 g of styrene is pumped into the reactor at a feed rate of 294 g/hr for 0.8 hour.

Following the complete addition of the monomer and aqueous charges (i.e., 4 hours), a one-hour cookdown is provided after which the latex is steam-stripped to remove the residual monomers and volatile organic substances. The resulting latex contains 42.7 percent polymer solids having an average diameter of 0.17 micrometer.

EXAMPLE 2

The two-stage latex is prepared having 80 parts of a 48:50 weight ratio styrene/butadiene monomer charge polymerized in the first stage, and 20 parts by weight of a 48:50 weight ratio of styrene/butyl acrylate monomer charge polymerized in the second stage. The itaconic acid monomer (2 parts by weight based on the total weight of the charge of the first stage) is added with the hereinafter described initial aqueous medium.

The first stage monomer mixes are each kept constant at 48 parts of styrene, 50 parts of butadiene and 2 parts of itaconic acid. The polymerizations are carried out at 90° C. under conditions similar to those described in Example 1. Total monomer addition times of 2, 3 and 4 hours are employed. The styrene/n-butyl acrylate ratio in the second stage monomer mix is varied at 38/60, 48/50, 58/40 and 100/0, respectively. These comonomer mixes are then added to the reactor at various stages relative to the completion of the total addition of the first stage monomer mix. That is, second stage addition is commenced at 0.5 hour before, directly after and 0.5 hour after the first stage monomer mix is completely added to the reactor.

Mechanical properties of the resulting encapsulated latex films are evaluated relative to the effect of the second stage monomer mix addition time on the crosslinking density of the encapsulated core and the mechanical properties of the latex film. The preparation of the latex films and test conditions are as follows. Latexes are thickened with 0.5 part of a thickener sold commercially as Acrosol GS, drawn-down with a 20 mil film bar on the glass plate and dried for 48 hours at room temperature. Then, films are cut into 2"×0.5" size samples. Film thicknesses are about 8 mil. The stress-strain curves of latex films are measured at the crosshead speed of 20 in/min. using an Instron tensile tester. The reported values of tensile strength and elongation at break are the average values of 5 strips for each latex sample. In order to test the water resistance, films are heated for 5 minutes at 130° C., soaked in water for 24 hours and then tested. The results are summarized in Table I.

TABLE I

| Sample[1] | Monomer Con-Add Time[2] (hrs) | Second Stage Composition[3] (S/nBA) | Time of Addition of Second Stage Mix[4] (hrs) | Second Stage Addition Time Relative to Completion of First Stage Addition (hrs) | Room Temp Dried Film | | 130° C./5 min. Cured + Soaked in H$_2$O for 24 Hrs | |
|---|---|---|---|---|---|---|---|---|
| | | | | | Tensile (psi) | Elongation (%) | Tensile (psi) | Elongation (%) |
| 1 | 2 | 58/40 | 2.1 | 0.5 after | 2,526 | 620 | 900 | 560 |
| 2 | 3 | 48/50 | 1.9 | 0.5 before | 1,768 | 580 | 850 | 600 |
| 3 | 3 | 48/50 | 2.4 | directly after | 2,086 | 590 | 874 | 580 |
| 4 | 3 | 48/50 | 2.9 | 0.5 after | 1,747 | 540 | 550 | 500 |
| 5 | 3 | 100/0 | 1.9 | 0.5 before | 2,598 | 570 | 1,805 | 640 |
| 6 | 4 | 38/60 | 2.7 | 0.5 before | 1,671 | 560 | 532 | 440 |
| C-1* | 2 | — | — | — | 1,177 | 660 | 399 | 590 |
| C-2* | 3 | — | — | — | 1,477 | 640 | 639 | 600 |
| C-3* | 4 | — | — | — | 956 | 510 | 323 | 400 |
| C-4* | 3 | — | — | — | 1,261 | 600 | 768 | 680 |

*Sample Nos. C-1 through C-4 are not examples of the invention but are presented for comparison purposes. Control samples C-1 through C-3 are 48:50:2, styrene/butadiene/itaconic acid. Homogeneous sample C-4 is 48:40:10:2, styrene/butadiene/n-butyl acrylate/itaconic acid. Comparative samples are prepared using conventional techniques and by employing 3 parts carbon tetrachlorides based on the weight of monomers.
[1]Sample Nos. 1 through 6 are examples of the invention.
[2]The monomer con-add time is the monomer feed time based on 100 parts monomer mix for both stages.
[3]The second stage composition comprises styrene and n-butyl acrylate (S/nBA). Amounts shown are in percent styrene to that of n-butyl acrylate relative to the total weight of the second stage charge. The first stage composition is 48:50:2, styrene/butadiene/itaconic acid for Sample Nos. 1 through 6. The monomer charge ratio of the first stage to the second stage is 80:20.
[4]Time of addition of the second stage mix is measured from the time the first monomer mix is first charged into the reactor.

The encapsulated latexes exhibit markedly higher tensile strengths than the latex controls. Furthermore, the encapsulated latexes retain elongation as high as that of the latex controls. It is also observed that the tensile strength can be increased while maintaining good elongation by decreasing the amount of n-butyl acrylate in the second stage monomer mix. This is illustrated by comparing the tensile strength and elongation of Sample Nos. 2 and 5.

The 2-hour monomer continuous addition samples represent a monomer flooded reaction similar to batch processes. The 3- and 4-hour monomer continuous addition samples represent processes where the reactor is run starved. It is observed that for the highest tensile strength and good elongation, the optimum time of addition of the 20-part noncrosslinkable monomer mix is in the range of from about 70 to about 75 percent instantaneous conversion of the first stage monomer mix regardless of the degree of monomer flooding.

What is claimed is:

1. A process for preparing coalescence-capable and deformable aqueous polymer latexes having controlled crosslinking density wherein the dispersed polymer particles are heterogeneous, which process comprises:
   (a) preparing by emulsion polymerization a core domain comprising the polymerization product of a portion of a first stage monomer mixture comprising at least one monovinyl aromatic monomer and at least one open chain conjugated diene monomer and
   (b) contacting said first stage monomer mixture at a point at which said mixture is partially polymerized with a second stage monomer mixture comprising at least one monovinyl monomer and substantially noncrosslinkable monomers wherein said second stage monomer mixture is introduced when the rate of conversion of monomer to polymer is such that (1) the latex particles so formed are not highly crosslinked, and (2) the second stage monomer mixture is polymerized to yield essentially noncrosslinked linear polymers to encapsulate the core domain as a shell and is partially covalently bonded to the partially polymerized core domain.

2. A process of claim 1 comprising from about 60 to about 90 weight parts of said first stage monomer mixture and from about 10 to about 40 weight parts of said second stage monomer mixture.

3. A process of claim 1 wherein said second stage monomer mixture is contacted with said first stage monomer mixture at a point at which about 60 to about 90 weight percent of said diene monomer is converted to polymer.

4. A process of claim 1 wherein said first stage monomer mixture comprises from about 30 to about 70 weight percent monovinyl aromatic monomer and from about 30 to about 70 weight percent of said diene monomer.

5. A process of claim 1 wherein said second stage monomer mixture comprises from about 30 to about 100 weight percent monovinyl aromatic monomer and from about 0 to about 70 weight percent of at least one other monovinyl monomer.

6. A coalescence-capable and deformable latex having controlled crosslinking density which is prepared using the process of claim 1.

7. A latex of claim 6 having an average diameter of from about 0.1 to about 0.3 micrometer.

8. A latex of claim 6 comprising a styrene/butadiene core domain and a styrene/n-butyl actylate shell domain.

9. The process of claim 1 wherein said second stage monomer mixture consists of monovinyl monomers or other noncrosslinkable monomers or agents.

* * * * *